United States Patent [19]
Neff

[11] Patent Number: 5,453,958
[45] Date of Patent: Sep. 26, 1995

[54] METHOD FOR LOCATING HYDROCARBON RESERVOIRS

[75] Inventor: Dennis B. Neff, Bartlesville, Okla.

[73] Assignee: Phillips Petroleum Company, Bartlesville, Okla.

[21] Appl. No.: 75,710

[22] Filed: Jun. 11, 1993

[51] Int. Cl.$^6$ .................. G01V 1/34; H03F 1/26
[52] U.S. Cl. .................. 367/70; 367/15; 367/47
[58] Field of Search .................. 367/15, 21, 28, 367/30, 47, 53, 70; 364/421

[56] References Cited

U.S. PATENT DOCUMENTS

| | | | |
|---|---|---|---|
| 4,059,760 | 11/1977 | Murphy | 250/253 |
| 4,155,403 | 5/1979 | Hurst | 166/252 |
| 4,214,226 | 7/1980 | Narasimhan et al. | 367/27 |
| 4,228,529 | 10/1980 | Hsu | 367/70 |
| 4,479,204 | 10/1984 | Silverman | 367/47 |
| 4,590,592 | 5/1984 | Bowman | 367/70 |
| 4,661,935 | 4/1987 | Shock et al. | 367/70 |
| 4,811,220 | 3/1989 | McEuen | 367/70 |
| 4,817,061 | 3/1989 | Alford et al. | 361/75 |
| 4,878,204 | 10/1989 | Black et al. | 367/421 |
| 5,018,112 | 5/1991 | Pinkerton et al. | 367/70 |

OTHER PUBLICATIONS

Neff, D. B.; 59th Annu. Soc. Explor. Geophys. Int. Mtg; Nov. 2, 1989; vol. 2, pp. 791–793; Pop. No. SI48; abstract only provided herewith.

Elrasan et al; Geophysics, vol. 48, #10, 1983, pp. 1305–1317; abst. only provided herewith.

*Primary Examiner*—Nelson Moskowitz
*Attorney, Agent, or Firm*—George E. Bogatie

[57] ABSTRACT

A method is provided by which the presence, if any, and location of a hydrocarbon reservoir or reservoirs adjacent to a subterranean surface can be determined based on DAD values which correspond to grid points of the surface. DAD values, specifically defined herein, relate to the change in seismic amplitude (Delta Amplitude) as divided by the Dip magnitude at each grid point. According to a preferred embodiment, colors are assigned to grid points based on the sign of the DAD values, and such assigned colors are plotted onto a depth/time contour map of the subterranean surface to result in a display which clearly indicates the location of any hydrocarbons.

8 Claims, 3 Drawing Sheets
(1 of 3 Drawing(s) in Color)

METHOD FOR LOCATING HYDROCARBON RESERVOIRS

BACKGROUND OF THE INVENTION

This invention relates to a method for locating hydrocarbon reservoirs by employing seismic data associated with a subterranean surface.

It is well known to use seismic data in determining subsurface structure. Certain structural characteristics, such as an anticline in proximity to a fault, are further known to be capable of entrapping a hydrocarbon reservoir. However, the presence of such structural characteristics as determined from seismic data is not sufficient to predict and locate hydrocarbon reservoirs since only a very small percentage of such subsurface structures actually contain hydrocarbons.

SUMMARY OF THE INVENTION

It is, therefore, an object of the invention to provide a novel method of accurately determining the presence and location of a hydrocarbon reservoir or reservoirs associated with a subterranean surface.

The above object is realized by a method comprising: determining a seismic amplitude value and a corresponding time/depth value for each point of a plurality of points spaced from one another over a predetermined area of a subterranean surface; determining a DAD value for each point based on the seismic amplitude value and time/depth value determined for each such point; and determining the presence, if any, and the location of a hydrocarbon reservoir or reservoirs adjacent to the subterranean surface based on the DAD values corresponding to each of the points of the subterranean surface.

The DAD value is hereinafter defined in the Detailed Description of the Invention, and is determined for a particular point of a surface from the change in seismic amplitude and corresponding dip magnitude associated with such point.

According to a preferred embodiment of the invention, a first color is assigned to positive DAD values and a second color is assigned to negative DAD values. Shades of such cellors represent the magnitudes of the absolute values of the corresponding DAD values. The color and shade assigned to each point of a subterranean surface can be plotted onto a depth/time contour map of such surface. As will be further explained in a subsequent example, the presence and location of a hydrocarbon reservoir or reservoirs can be easily determined from the resulting display.

BRIEF DESCRIPTION OF THE DRAWINGS

The file of this patent contains one drawing executed in color. Copies of this patent with the color drawing will be provided by the Patent and Trademark Office upon request and payment of the necessary fee.

DETAILED DESCRIPTION OF THE INVENTION

An embodiment of the invention is described below with reference to the FIGURES. The invention is applicable to any subterranean surface for which there is a measurable change of seismic amplitude resulting from the presence of hydrocarbons. Most formations in which the surface lies will demonstrate this characteristic.

Figure 1:
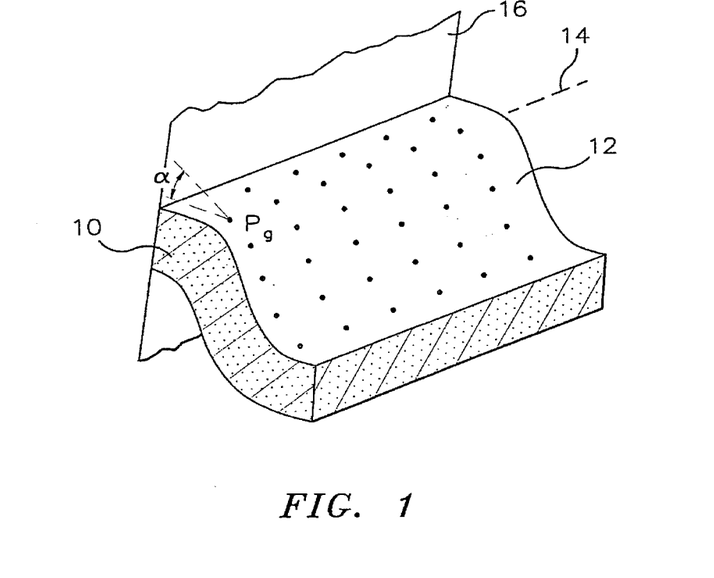
FIG. 1 is a schematic illustration of a section of a subterranean layer having an upper surface which is analyzed in accordance with the invention.

Referring to FIG. 1, there is schematically shown a cross section of a subterranean layer 10 having on upper surface 12. Although an upper surface is referenced in this description, it should be understood that any surface associated with layer 10 (i.e. lower surface or internal surface) could be employed as long as such surface will reflect seismic waves. As shown, the surface 12 has a plurality of points, hereinafter referred to as "grid points" denoted by "$P_g$", which are spaced from one another over the illustrated area of surface 12. Grid points $P_g$ are preferably oriented so as to be regularly spaced from one another about 25–200 meters, and most preferably about 50–100 meters. The number of grid points $P_g$ is dependent at least; in part on the area of surface 12 containing such grid points, which typically ranges from only a few hundred acres to several thousand acres as measured in a horizontal plane onto which surface 12 is projected. The number of grid points $P_g$ is also dependent, in accordance with a preferred embodiment described below, on the amount of seismic data associated with surface 12 which is available. Also shown in FIG. 1 is a schematic depiction of a fault at 16.

Some terms which are referenced hereafter will now be defined.

The "line of strike" at a grid point $P_g$ is that line defined by the intersection of a horizontal plane, with surface 12 at $P_g$. More specifically, the line of strike is defined by $P_g$ and surface points surrounding $P_g$ as they approach $P_g$ in the intersecting horizontal plane. The line of strike, for a particular grid point $P_g$ in FIG. 1 is shown at 14.

The "dip angle" at a grid point $P_g$ is the acute angle defined between the plane of surface 12 at $P_g$ and a horizontal plane containing $P_g$. The plane of surface 12 at $P_g$ is that plane defined by surface points surrounding $P_g$ as they approach $P_g$. The dip angle is measured in a vertical plane which defines a right angle with respect to the line of strike. For a particular point $P_g$ in FIG. 2, the dip angle of surface at such point is denoted as "$\alpha$".

The "DAD plane" corresponding to a point $P_g$ is the vertical plane in which the dip angle is measured for such point. The derivation of the acronym "DAD" will be explained in the following description.

The term "time/depth value" as used in the following description and the appended claims refers to a value which is expressible in terms of either time (i.e. two way travel time for a reflected seismic wave) or depth. It is understood that when this term is used, units of time or depth can be used with equivalent effect.

The following steps are in accordance with a preferred embodiment of the invention.

1. Determine Seismic Amplitude Value and Time/Depth Value for Each Grid Point

A seismic amplitude value and corresponding time/depth value is determined for each grid point $P_g$ preferably from a plurality of seismic traces as described below.

The seismic traces should correspond to locations distributed over surface 12 which need not correspond to grid points $P_g$. Each seismic trace includes a reflection event which corresponds to a particular location on surface 1.2 and which has a corresponding seismic amplitude value and time/depth value. Such seismic amplitude and time/depth values corresponding to the seismic traces can be employed to derive the seismic amplitude and time/depth values for points $P_g$ by interpolation or other mathematical estimation techniques well known to those skilled in the art of computer mapping. If desired, any particular seismic trace and its corresponding seismic amplitude and time/depth value can alternatively be assigned directly to an individual grid point $P_g$ if the location corresponding to such seismic trace is deemed to be sufficiently close to the location of the grid point. The number of seismic traces employed is preferably greater than the number of grid points $P_g$ and results are generally optimized by maximizing the ratio of the number of seismic traces to number of grid points $P_g$. Such ratio is typically between about 1:1 and about 10:1.

Each of the seismic traces can be obtained by conventional surface seismic equipment such as seismic sources and receivers (geophones). According to typical practice, seismic traces are from either a single set of 3-D seismic traces, which is preferred, or from several sets (or lines) of 2-D seismic traces. As is well known to those skilled in the art, a seismic trace corresponding to a particular location on a subterranean surface is typically a "composite" trace resulting from stacking of numerous traces corresponding to such location and produced by detection of seismic waves, reflected from the location, by receivers of source-receiver pairs having the location as their common depth point.

2. Determine DAD Value for Each Grid Point

A DAD value is determined as discussed below for each grid point $P_g$ based on the seismic amplitude value and time/depth value determined for each such grid point.

A "DAD value" for grid point $P_g$ as used herein and in the appended claims, is defined as $\pm \Delta A/M_d$ at such point in its corresponding DAD plane, where $\Delta A$ is the change in amplitude ("Delta Amplitude") and $M_d$ is the corresponding change in time/depth ("Dip Magnitude"), and further where a positive or negative convention is maintained for the determination of the DAD value for each grid point $P_g$. The negative convention, where $\Delta A/M_d$ is multiplied by $-1$, is most typically employed and is so employed in a subsequent example. The determination of a single DAD value by calculating the slope of a linear function is illustrated below with reference to FIGS. 2 and 3.

Figure 2:
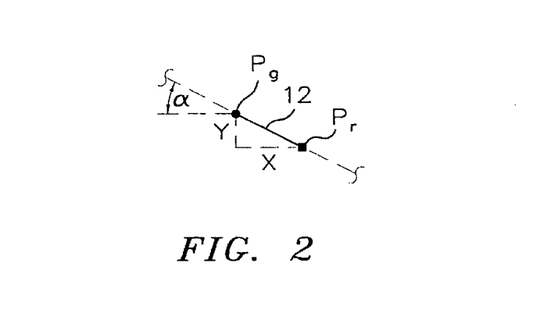
FIG. 2 schematically illustrates a particular point on the surface, and is referenced to explain the determination of a DAD value for this point.

Referring to FIG. 2, there is shown a particular grid point $P_g$ of surface 12 in its corresponding DAD plane, which according to FIG. 2 is the plane of the paper. FIG. 2 also shows the dip angle $\alpha$ at grid point $P_g$. A reference point $P_r$ of surface 12 is selected which is in the same DAD plane and which is offset from $P_g$ a predetermined horizontal distance x (y component is referenced below). Such horizontal distance x is preferably sufficiently small so that the surface 12 between $P_g$ and $P_r$ in the DAD plane approximates a straight line. Typically and most conveniently, horizontal distance x is set to be equivalent to the spacing between time grid points and is held constant in determination of DAD values for each grid point.

Assuming for the sake of illustration that a depth value is determined in step 1 for grid point $P_g$ in FIG. 2, $P_g$ will have a data-pair of amplitude and depth associated therewith which can be denoted as $(d_g, A_g)$ and $P_r$ can have an associated data-pair denoted as $(d_r, A_r)$. Each of such data-pairs are shown as being plotted in a simple graph of depth v, amplitude in FIG. 3. The individual values of the data-pair for $P_r$ may not be known from actual data, but can be estimated, as discussed above with regard to grid points $P_g$, by interpolation or other suitable mathematical estimation technique employing known data-pairs associated with locations on surface 12 adjacent to $P_r$.

Figure 3:
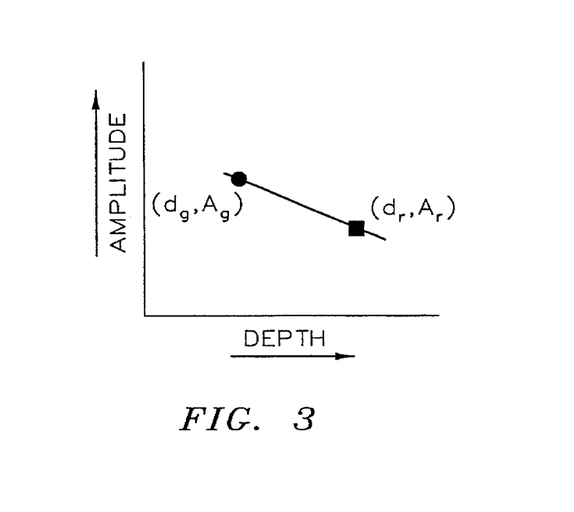
FIG. 3 is a simple graph of depth v. amplitude which graphically illustrates the relationship of slope to the DAD value. Depth and amplitude increase, in the direction of the indicated arrows.

The DAD value for grid point $P_g$ in FIG. 2 having corresponding data-pair $(d_g, A_g)$ is given by $\pm$slope of the line defined by $(d_g, A_g)$ and $(d_r, A_r)$ as plotted in FIG. 3 Such slope is determined from either $(A_g - A_r)/(A_r - A_g)/(d_r - d_g)$, in accordance with the above-mentioned formula $\Delta A/M_d$ (where in this case $M_d$ is the y component in FIG. 2). The particular slope shown in FIG. 3 is negative and, assuming a negative convention, the corresponding DAD value is positive. It can be seen from FIG. 3 that a negative slope and corresponding positive DAD value employing the—convention corresponds to the case where amplitude increases with decreasing depth ("undip"). It should be apparent that a DAD value can also be negative, or zero where $A_g$ is equal to $A_r$. Another possibility is where the dip angle is zero, $d_g$ is equal to $d_r$ and $M_d$ is zero so as to give an incalculable DAD "value" of infinity.

Of course, the above discussion regarding data-pairs comprising amplitude values and depth values equally applies to data-pairs comprising amplitude and time values.

3. Assign Colors and Shades of Colors to Grid Points

According to the preferred embodiment, a first color (i.e. red) is assigned to each of the grid points which has a positive DAD value and a second color (i.e. blue) is assigned to each of the grid points which has a negative DAD value. It is most preferable to also assign a shade of color to each grid point which has a first color or second color assigned thereto, wherein the darkness of shade assigned is based on the magnitude of the absolute value of the corresponding DAD value, It is further preferable to assign no color to points which have DAD values of zero or incalculable DAD values of infinity.

4. Plot Colors for Grid Points onto Contour Map

A depth/time contour map of surface 12 is needed to carry out this step. Such a contour map is obtained by projecting such surface onto a horizontal plane, and connecting common depth/time values with contour lines. This provides the interpreter/geoscientist a clear picture of the structure of the surface being mapped.

In accordance with the preferred embodiment, first color or second color is plotted by a suitable plotter onto the contour map at points on the contour map which correspond to grid points (as projected onto the map in a horizontal plane) having one of such colors assigned thereto. The shade of color is controlled in accordance with the magnitudes of the absolute values of positive or negative DAD values associated with the grid points. Grid points having DAD values of zero or which are incalculable (infinity) are, as noted above, assigned no color, and are therefore left unplotted and preferably white (color of paper). It is also possible to leave unplotted those grid points having positive or negative DAD values within a certain range above or below zero.

Figure 4:
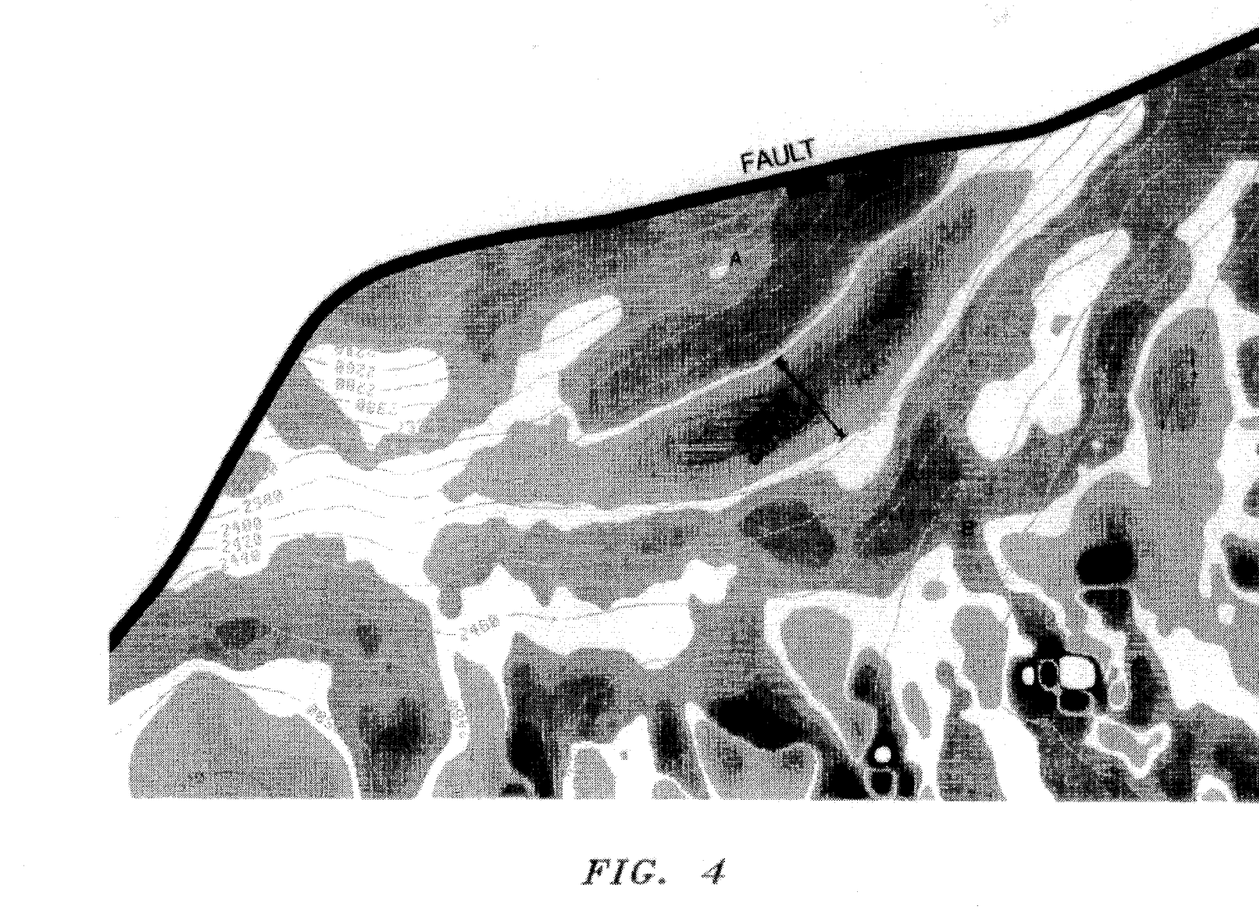
FIG. 4 is a color display in accordance with a/preferred embodiment of the invention.

A typical display resulting from this step is shown in FIG. 4, and is further discussed in a subsequent example.

5. Determine Presence and Location of Hydrocarbon Reservoir or Reservoirs Based on DAD Values The presence, if any, and location of a hydrocarbon reservoir or reservoirs adjacent to surface 12 can be determined based on the DAD values corresponding to the grid points $P_g$ of such surface. Such determination is most easily made in accordance with the preferred embodiment by an examination of the display resulting from step 4. Such examination involves study of the relative orientation of depth/time contours of the contour map and areas of first color or second color as plotted on the contour map. More specifically, and as is further illustrated in a subsequent example, the presence of hydrocarbons is indicated by an area of first color or second color which parallels contours and which is associated with structure likely to entrap hydrocarbons, such as time/depth contours which intersect a fault at two separate points ("time/depth closure").

Figure 5:
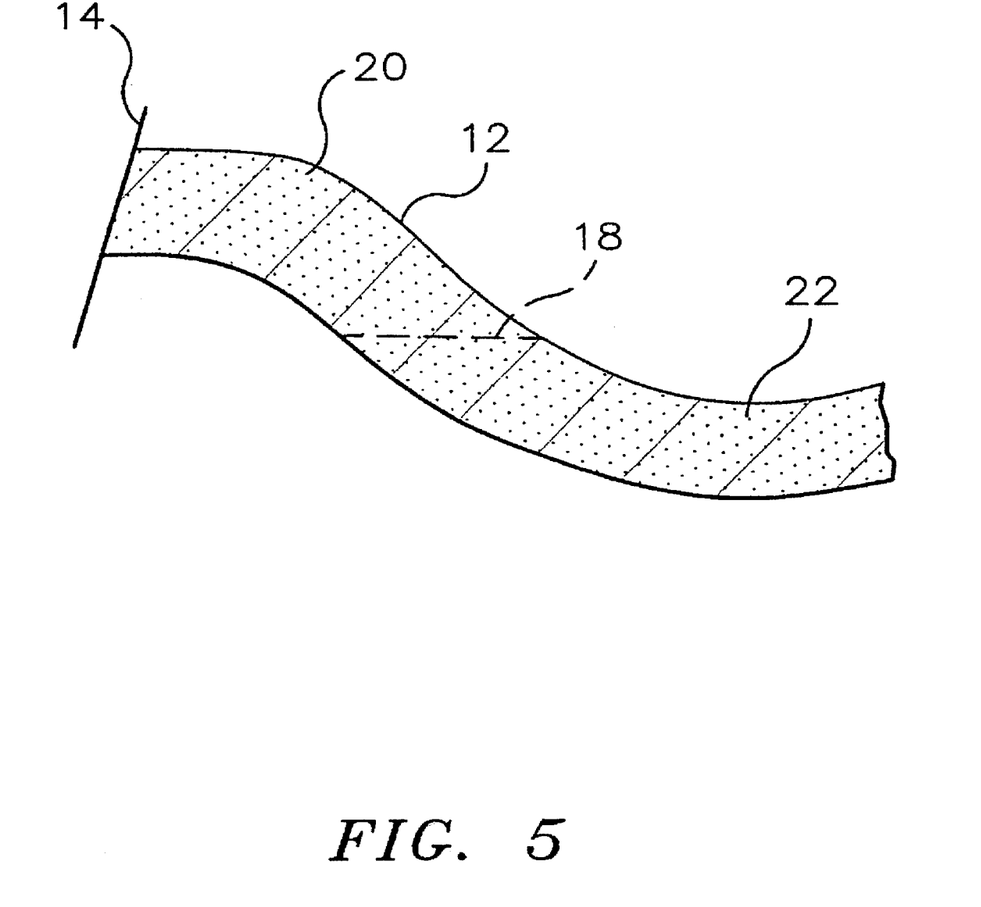
FIG. 5 is another view of the layer depicted in FIG. 1 which illustrates a possible location of a hydrocarbon reservoir within such layer.

With reference to FIG. 5, the method of the invention is particularly effective in detecting the presence and extent of a boundary 18 between a hydrocarbon reservoir at 20 and water wet reservoir at 22. This is demonstrated in the following example.

Obviously many modifications and variations of the present invention are possible in light of the above teachings. It is, therefore, to be understood that within the scope of the appended claims the invention may be practiced otherwise than as specifically described. For example, according to certain broad aspects of the invention, numerical DAD values and corresponding grid point locations could be printed out or otherwise displayed and then analyzed to determine the presence and location of any hydrocarbon reservoir.

EXAMPLE

The method of the invention according to the above-described preferred embodiment was applied to an upper reflecting surface of a subterranean layer using a computer program which is further described below. Such surface, as projected onto a horizontal plane, covered an area of about 1700 acres. A total of 2800 regularly spaced grid points, spaced 50 meters apart, were employed. A 3-D data set comprising about 1,000 seismic traces, corresponding to different locations over the subterranean surface, was employed to obtained in a seismic amplitude value and time/depth value for each grid point. For each grid point, the seismic amplitude and time/depth values associated with all seismic traces corresponding to locations within 25 meters of such grid points were processed by ZYCOR computer mapping software (infra) to derive a seismic amplitude value and time/depth value for the grid point. A DAD value (in this case $-\Delta AS/M_d$) was determined for each grid point by employing a reference point spaced from its corresponding grid point a horizontal distance equivalent to the above-mentioned grid point spacing. The color red and corresponding shades (10) thereof was assigned to each of the grid points having positive DAD values and the color blue and corresponding shades (10) thereof was assigned to each of the grid points having negative DAD values. No color was assigned to grid points having zero DAD values or incalculable DAD values (infinity). The red and blue colors and shades thereof were plotted by a Versatec plotter onto a two way travel time (milliseconds) contour map to result 7in the display of FIG. 4.

In examination of the display of FIG. 4, two anomalous areas stand out area A between the 2420 millisecond contour and the fault; and area B adjacent to the 2500 millisecond contour. Although area B is characterized by a relatively large red region, such red region does not clearly parallel structural contours and also is not in an area likely to entrap hydrocarbons, such as a time closure. Area A, in contrast, is characterized by a large red band which closely parallels and lies between the 2360 and 2420 millisecond contours, and further is within the time closure defined by the 2420 millisecond contour which intersects the fault at two spaced locations. Area. A is, therefore, determined to be an area likely to contain a hydrocarbon reservoir, which extends from the fault to the 2420 millisecond con, tour adjacent to the downdip edge (edge at maximum depth) of the red band. Area B can be attributed to rock lithology changes rather than hydrocarbons.

The above conclusions reached by means of the invention are consistent with actual drilled wells and well logs. Two hydrocarbon producing wells are located in area A, between the fault and the 2360 millisecond contour. Three hydrocarbon producing wells are located between the 2360 millisecond and 2420 millisecond contours. Four water wet wells are located downdip of the 2420 millisecond contour, including Area. B. Resistivity well logs were taken to confirm the hydrocarbon-water boundary at the 2420 millisecond contour, which approximately corresponds to the downdip edge of the red band in FIG. 4. Therefore, the downdip edge of the red band accurately indicates one edge of the hydrocarbon-water boundary (i.e. the right edge of boundary 18 in FIG. 5), and the updip edge (edge at minimum depth) of the red band is taken to indicate the opposite edge of the hydrocarbon-water boundary (i.e. the left edge of boundary 18 in FIG. 5) as projected onto surface 12.

Computer Program

Set forth below is a computer program in ZYCOR MACRO language, for use with a Sun 670 computer. This program is employed in conjunction with ZYCOR computer mapping software, available from Landmark Graphics Corporation of Houston, Tex., to perform the data processing steps of the invention. Input data for the program includes a digital computer file with gridded time/depth and seismic amplitude data.

```
MACRO NAME = DAD
!
!
!
*INSTR    ,    INPUT,      GRID          /
*MFDSTR   ,    MFDNUM,         1, 1,0,5  /
*INAMP    ,    INPUT,      GRID          /
*MFDAMP   ,    MFDNUM,         1, 1,0,5  /
*DELTA,        OUTPUT,     GRID, delta   /
!
END PARAMETERS
!
BEGIN PROMPTS
 INSTR, Input structure grid name
 MFDSTR, Input mfd number
 INAMP, Input amplitude grid name
 MFDAMP, Input mfd number
 DELTA, Output delta file name
END PROMPTS
C
    SINGLEGRIDOPS:001,000
            OPNAME    = 'DIPMAG',
            GRIDIN    = &INSTR,
            GRIDOUT   = 'dipmag',
            MFDOUT    =               0,
            MFDIN     = &MFDSTR,
            MFDFAULT  =               0,
            ZNON      =       0.10000000E+31,
            /
C
    SINGLEGRIDOPS:002,000
            OPNAME    = 'DIPAZM',
            GRIDIN    = &INSTR,
            GRIDOUT   = 'dipazm',
            MFDOUT    =               0,
            MFDIN     = &MFDSTR,
            MFDFAULT  =               0,
            MFDFAULT  =               0,
            ZNON      =       0.10000000E+31,
            /
C
    SINGLEGRIDOPS:003,000
            OPNAME    = 'SIN',
            GRIDIN    = 'dipazm',
            GRIDOUT   = 'dipazmsin',
            MFDOUT    =               0,
            MFDIN     =               0,
            MFDFAULT  =               0,
            ZNON      =       0.10000000E+31,
```

```
      /
C
   SINGLEGRIDOPS:004,000
         OPNAME    = 'COS',
         GRIDIN    = 'dipazm',
         GRIDOUT   = 'dipazmcos',
         MFDOUT    =              0,
         MFDIN     =              0,
         MFDFAULT  =              0,
         ZNON      =        0.10000000E+31,
         /
C
   SINGLEGRIDOPS:005,000
         OPNAME    = 'DX',
         GRIDIN    = &INAMP,
         GRIDOUT   = 'da/dx',
         MFDOUT    =              0,
         MFDIN     = &MFDAMP,
         MFDFAULT  =              0,
         ZNON      =        0.10000000E+31,
         /
C
   SINGLEGRIDOPS:006,000
         OPNAME    = 'DY',
         GRIDIN    = &INAMP,
         GRIDOUT   = 'da/dy',
         MFDOUT    =              0,
         MFDIN     = &MFDAMP,
         MFDFAULT  =              0,
         ZNON      =        0.10000000E+31,
         /
C
   DUALGRIDOPS:001,000
         OPNAME    = 'MULTIPLY',
         GRIDIN1   = 'da/dx',
         GRIDIN2   = 'dipazmsin',
         GRIDOUT   = 'da/dx * sin',
         MFDOUT    =              0,
         MFDIN1    =              0,
         MFDIN2    =              0,
         ZNON      =        0.10000000E+31,
         AOISRCE   = 'GRIDIN1',
         XINCSRCE  = 'GRIDIN1',
         YINCSRCE  = 'GRIDIN1',
         XINC      =        500.00000    ,
         YINC      =        500.00000    ,
         /
C
   DUALGRIDOPS:002,000
         OPNAME    = 'MULTIPLY',
```

```
            GRIDIN1   = 'da/dy',
            GRIDIN2   = 'dipazmcos',
            GRIDOUT   = 'da/dy * cos',
            MFDOUT    =           0,
            MFDIN1    =           0,
            MFDIN2    =           0,
            ZNON      =    0.10000000E+31,
            AOISRCE   = 'GRIDIN1',
            XINCSRCE  = 'GRIDIN1',
            YINCSRCE  = 'GRIDIN1',
            XINC      =       500.00000    ,
            YINC      =       500.00000    ,
            /
C
    DUALGRIDOPS:003,000
            OPNAME    = 'ADD',
            GRIDIN1   = 'da/dx * sin',
            GRIDIN2   = 'da/dy * cos',
            GRIDOUT   = 'da/ds',
            MFDOUT    =           0,
            MFDIN1    =           0,
            MFDIN2    =           0,
            ZNON      =    0.10000000E+31,
            AOISRCE   = 'GRIDIN1',
            XINCSRCE  = 'GRIDIN1',
            YINCSRCE  = 'GRIDIN1',
            XINC      =       500.00000    ,
            YINC      =       500.00000    ,
            /
C
    DUALGRIDOPS:004,000
            OPNAME    = 'DIVIDE',
            GRIDIN1   = 'da/ds',
            GRIDIN2   = 'dipmag',
            GRIDOUT   = &DELTA,
            MFDOUT    = &MFDSTR,
            MFDIN1    =           0,
            MFDIN2    =           0,
            ZNON      =    0.10000000E+31,
            AOISRCE   = 'GRIDIN1',
            XINCSRCE  = 'GRIDIN1',
            YINCSRCE  = 'GRIDIN1'    /
C
    DELF:001,000 FILENAME='dipmag' /
    DELF:002,000 FILENAME='dipazm'/
    DELF:003,000 FILENAME='dipazmsin' /
    DELF:004,000 FILENAME='dipazmcos' /
    DELF:005,000 FILENAME='da/dx' /
    DELF:006,000 FILENAME='da/dy' /
    DELF:007,000 FILENAME='da/dx * sin' /
```

```
    DELF:008,000 FILENAME='da/dy * cos' /
    DELF:009,000 FILENAME='da/ds' /

STOP:001,000      /
```

That which is claimed is:

1. A method comprising determining a seismic amplitude value and a corresponding time/depth value for each grid point of a plurality of grid points spaced from one another over a predetermined area of a subterranean surface, wherein the amplitude value and the time/depth value for each of the plurality of grid points is derived from a plurality of seismic traces corresponding to locations distributed over the predetermined area of the subterranean surface;

determining a DAD value for each grid point based on the seismic amplitude value and time/depth value determined for each such grid point;

determining the presence, if any, and location of a hydrocarbon reservoir or reservoirs adjacent to the subterranean surface based on the DAD values corresponding to the grid points of the predetermined area of the subterranean surface.

2. A method as recited in claim 1 wherein the method further comprises the steps of assigning a first color to each point having a positive DAD value and a second color to each point having a negative DAD value, and plotting a first color or second color which is assigned to corresponding points onto a depth/time contour map of the subterranean surface, and wherein the presence, if any, and location of a hydrocarbon reservoir or reservoirs is determined based on the relative orientation of depth/time contours of the contour map and areas of first color or second color as plotted on the contour map.

3. A method as recited in claim 2 wherein the method further comprises assigning a shade of color to each point which has a first color or second color assigned thereto, wherein the darkness of the shade assigned is based on the magnitude of the absolute value of the corresponding DAD value.

4. A method as recited in claim 1 wherein the seismic amplitude value and time/depth value is determined for each point from a plurality of seismic traces, wherein each seismic trace includes a reflection event associated with the subterranean surface.

5. A method comprising determining a seismic amplitude value and a corresponding time/depth value for each point of a plurality of points spaced over a predetermined area of a subterranean surface;

determining a DAD value for each point based on the seismic amplitude value and time/depth value determined for each such point;

assigning a first color to each point which has a positive DAD value and a second color to each point which has a negative DAD value; and plotting a first color or second color which is assigned to corresponding points onto a depth/time contour map of the subterranean surface.

6. A method as recited in claim 5 wherein the method further comprises assigning a shade of color to each point which has a first color or second color assigned thereto, and wherein the darkness of the shade assigned is based on the magnitude of the absolute value of the corresponding DAD value.

7. A method as recited in claim 5 wherein the seismic amplitude value and time/depth value is determined for each point from a plurality of seismic traces, wherein each seismic trace includes a reflection event associated with the subterranean surface.

8. A method in accordance with claim 1, wherein the DAD value for each of the grid points is determined according to the equation $$DAD = (A_g - A_r)/(d_g - d_r)$$

where:

$A_g$ is the seismic amplitude value for a selected grid point, $d_g$ is the time/depth value for the selected grid point, $A_r$ is the seismic amplitude value for a selected reference point, and $d_r$ is the time/depth value for the selected reference point.

* * * * *